G. CLEMENTS.
HANDLE CLIPS FOR VACUUM CLEANERS.
APPLICATION FILED JUNE 24, 1912.
1,082,069.
Patented Dec. 23, 1913.
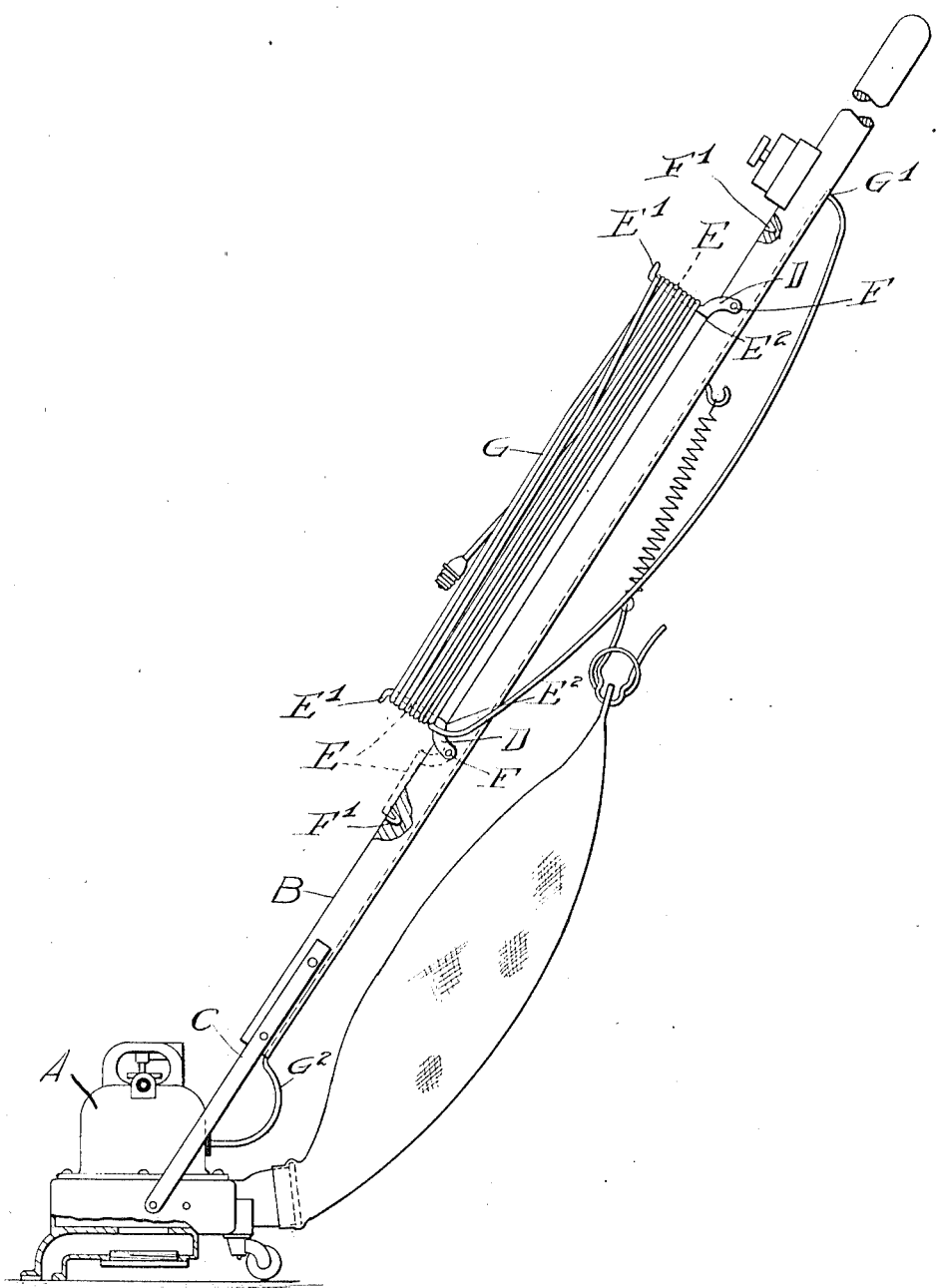

UNITED STATES PATENT OFFICE.

GEORGE CLEMENTS, OF CHICAGO, ILLINOIS, ASSIGNOR TO CLEMENTS MFG. CO., OF CHICAGO, ILLINOIS, A CORPORATION OF ILLINOIS.

HANDLE-CLIPS FOR VACUUM-CLEANERS.

1,082,069.  Specification of Letters Patent.  Patented Dec. 23, 1913.

Original application filed June 14, 1911, Serial No. 633,011. Divided and this application filed June 24, 1912. Serial No. 705,400.

*To all whom it may concern:*

Be it known that I, GEORGE CLEMENTS, a citizen of the United States, residing at Chicago, in the county of Cook and State of Illinois, have invented a certain new and useful Improvement in Handle-Clips for Vacuum-Cleaners, of which the following is a specification.

My invention relates to handle clips for vacuum cleaners and the like, and has for its object to provide means for supporting on the handle of such a device a flexible connector.

The invention is illustrated in the accompanying drawing wherein my invention is shown as applied to a vacuum cleaner.

A is the cleaner, B the handle, and C the bail whereby they are connected.

D, D are the lower bifurcated ends of clips E, E, each of which has the outwardly turned upper end $E^1$, and is adapted at $E^2$ of the bifurcated lower portion to bear upon the handle so that the two clips stand firmly in the position indicated in the drawing. Each clip is pivoted at F in such manner that the outwardly turned upper ends $E^1$ may enter the hole $F^1$ in the handle. G is the connector or spiral conductor adapted to be wound around the clips and connected at $G^1$ to the binding post from which leads the connector $G^2$ to the motor contained within the case of the cleaner.

Of course the device could be varied somewhat in structure and arrangement, and could be used for other purposes than supporting the electrical conductor of an electrical vacuum cleaner, though this is the connection in which it is illustrated.

The use and operation of my invention are as follows: When the vacuum cleaner is out of use, the connection is coiled on the clips as indicated, and the whole may be stored. When the vacuum cleaner is to be used, the connector is uncoiled and connected with its source of electrical supply. The two clips are then folded down each upon the handle, the upper outwardly bent end engaging a hole in the handle. Thus a smooth, uninterrupted handle is provided for the use of the operator.

The subject matter shown in this case but also shown and described and claimed in my co-pending applications, Nos. 633,011, 705,398, and 705,399, is not claimed herein.

I claim:

1. The combination of a handle with two coil-holding clips, each pivotally mounted on the handle provided with a stop to limit its motion, and provided with an outer bent end, said handle provided with holes to receive the bent ends.

2. The combination of a handle with two coil-holding bifurcated clips, each pivotally mounted on the handle and adapted to engage the handle at the crotch of the bifurcation and provided with an outer bent end, said handle provided with holes to receive the bent ends when turned down into inoperative positions.

3. The combination of an implement handle with two arms pivoted thereon, said arms being bifurcated at their lower ends adjacent the handle, said bifurcations extending down substantially to the center of the handle on opposed sides, and pivots passing through the handle and through said bifurcated ends, said bifurcated ends being offset from said arms.

4. The combination of an implement handle with two arms pivoted thereon, said arms being bifurcated at their lower ends adjacent the handle, said bifurcations extending down substantially to the center of the handle on opposed sides, and pivots passing through the handle and through said bifurcated ends, said bifurcated ends being offset from said arms, said arms being provided with outwardly turned tips, said handle being apertured to engage said tips when said arms are folded into position substantially parallel with said handle.

5. The combination with a straight implement handle shaft of reel fingers pivotally mounted thereon, means upon said fingers for holding a cord in position thereupon and means upon said handle into which a portion of said fingers may engage, said fingers being bifurcated and free to assume a position of substantial parallelism with the handle.

In testimony whereof, I affix my signature in the presence of two witnesses this 21st day of June 1912.

GEORGE CLEMENTS.

Witnesses:
GENEVA HIRTH,
DENIE A. WALTERS.